(12) United States Patent
Cai

(10) Patent No.: US 6,777,007 B2
(45) Date of Patent: Aug. 17, 2004

(54) POD AND METHOD FOR MAKING FLUID COMESTIBLE

(76) Inventor: Edward Z. Cai, 4767 NW. Jeanice Pl., Corvallis, OR (US) 97330

( * ) Notice: Subject to any disclaimer, the term of this patent is extended or adjusted under 35 U.S.C. 154(b) by 0 days.

(21) Appl. No.: 10/190,399

(22) Filed: Jul. 6, 2002

(65) Prior Publication Data
US 2004/0005384 A1 Jan. 8, 2004

(51) Int. Cl.⁷ .............................................. B65B 29/02
(52) U.S. Cl. ........................ 426/78; 426/115; 426/79; 206/0.5
(58) Field of Search ...................... 206/0.5; 426/77–79, 426/86, 113, 115, 119–120

(56) References Cited

U.S. PATENT DOCUMENTS

| | | | |
|---|---|---|---|
| 2,743,664 A | * | 5/1956 | Dale ............................ 99/295 |
| 3,275,448 A | * | 9/1966 | Sommer ...................... 426/115 |
| 3,446,624 A | * | 5/1969 | Luedtke ....................... 426/77 |
| 3,952,641 A | | 4/1976 | Vitous |
| 3,975,996 A | | 8/1976 | Vitous |
| 4,389,925 A | | 6/1983 | Piana |
| 4,471,689 A | | 9/1984 | Piana |
| 4,759,474 A | | 7/1988 | Regunathan |
| 4,867,993 A | * | 9/1989 | Nordskog ..................... 426/77 |
| 4,886,674 A | | 12/1989 | Seward |
| 4,983,410 A | * | 1/1991 | Dinos ........................... 426/77 |
| 4,995,978 A | | 2/1991 | Van de Gang |
| 5,108,768 A | * | 4/1992 | So ............................... 426/77 |
| 5,147,540 A | * | 9/1992 | Hagan ........................ 210/232 |
| 5,190,652 A | | 3/1993 | Van Thoor |
| 5,197,374 A | | 3/1993 | Fond |
| 5,242,702 A | | 9/1993 | Fond |
| 5,298,267 A | * | 3/1994 | Gruenbacher ................ 426/77 |
| 5,325,765 A | | 7/1994 | Sylvan |
| 5,398,595 A | | 3/1995 | Fond |
| 5,472,719 A | | 12/1995 | Favre |
| 5,633,026 A | * | 5/1997 | Gruenbacher ................ 426/77 |
| 5,637,335 A | | 6/1997 | Fond et al. |
| 5,638,740 A | | 6/1997 | Cai |
| 5,656,316 A | | 8/1997 | Fond et al. |
| 5,760,118 A | * | 6/1998 | Sinclair et al. ............. 524/306 |
| 5,840,189 A | | 11/1998 | Sylvan et al. |
| 5,897,899 A | | 4/1999 | Fond |
| 6,021,705 A | | 2/2000 | Dijs |
| 6,079,315 A | | 6/2000 | Beaulieu |
| 6,119,582 A | | 9/2000 | Akkerman-Theunisse et al. |
| 6,158,328 A | | 12/2000 | Cai |
| 6,182,554 B1 | | 2/2001 | Beaulieu |
| 6,202,541 B1 | | 3/2001 | Cai |
| 6,485,766 B2 | * | 11/2002 | Herod ......................... 426/78 |

* cited by examiner

*Primary Examiner*—Drew Becker

(57) ABSTRACT

A pod for making coffee, espresso, hot chocolate, mocha, latte or the like comprises a first sheet of filtering paper having an open top end, a bottom and a substantially vertical side wall adapted to form a seal with the vertical side wall of a pod holder, a second sheet adapted to fit into the open top end of the first sheet to form a closed chamber between the sheets, a supply of flavor-containing materials in the closed chamber, and a sealing seam between the side walls of the first sheet and the second sheet. The sealing seam is adapted to prevent formation of bypass channels between the pod and the side wall of a pod holder, thereby causing all or nearly all the hot water introduced to the pod holder to pass through the flavor-containing materials between the first and second sheets. Method for using the pod to make coffee, espresso, hot chocolate, mocha, latte or the like is provided.

18 Claims, 6 Drawing Sheets

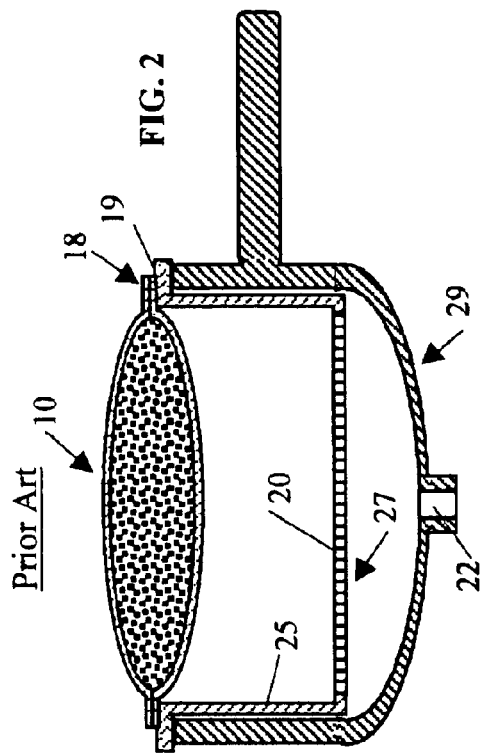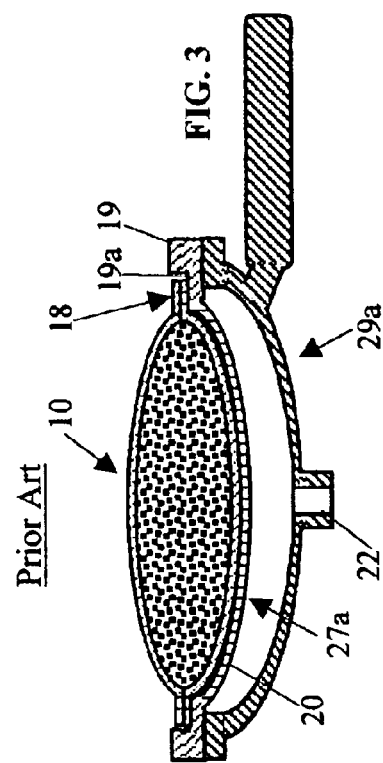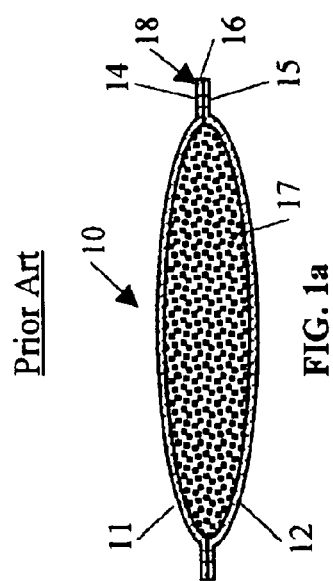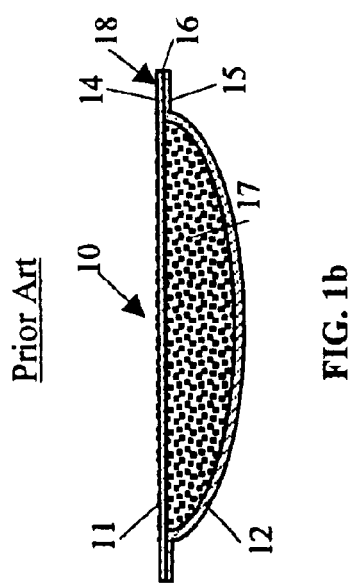

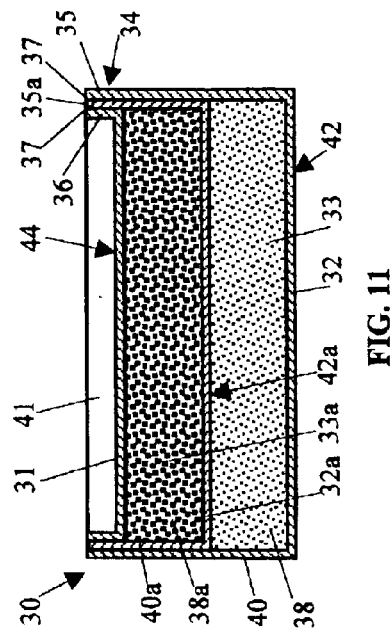
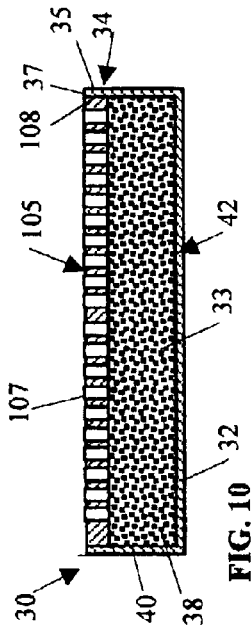
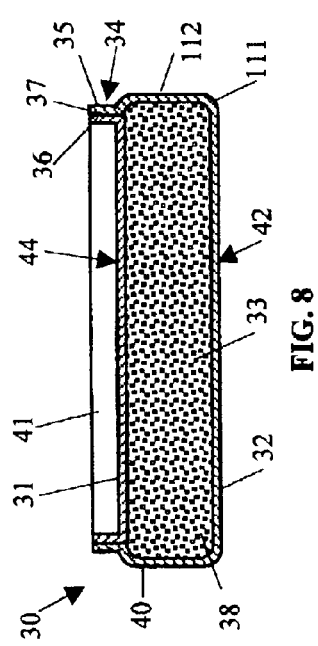
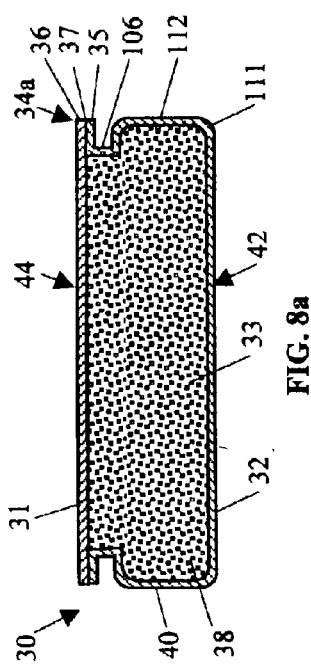
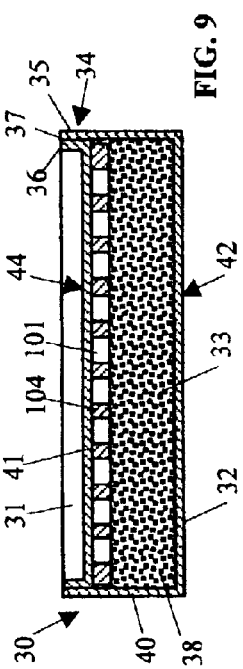

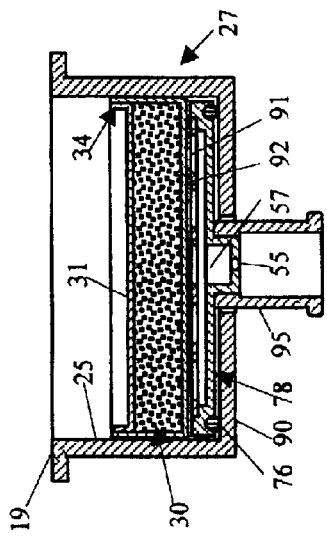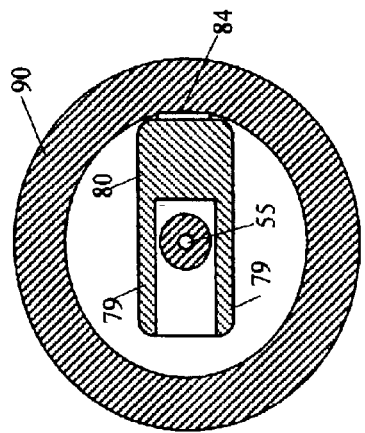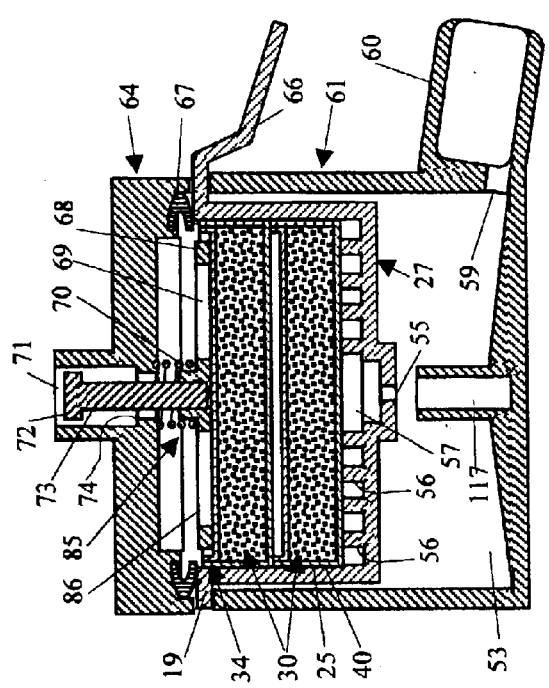

POD AND METHOD FOR MAKING FLUID COMESTIBLE

FIELD OF THE INVENTION

The invention relates to a new pod and method for making fluid comestibles such as coffee, espresso, herb, tea, milk, hot chocolate, latte, cappuccino or mocha. More particularly, the invention relates to a pod in which flavor-containing material such as coffee grounds or cocoa is sandwiched between two porous sheets and method for extracting or dissolving the flavor from the flavor-containing material in the pod.

BACKGROUND OF THE INVENTION

Today, coffee and espresso arc generally made by adding loose coffee grounds into a filter and applying hot water to the grounds. In automatic drip coffeemakers, the water seeps through the grounds due to gravity, while in espresso machines the water is forced through grounds by pressure. One major issue with today's method of making coffee and espresso is the messiness in handling of the loose coffee grounds.

The two known solutions to this messiness problem are coffee pods, which comprise a supply of coffee grounds sandwiched between two sheets of filter paper as shown in FIGS. 1a and 1b, and coffee cartridges or capsules, which comprise a supply of coffee grounds sealed in an aluminum foil or plastic container as taught in U.S. Pat. No. 5,108,768 to So, U.S. Pat. No. 5,637,335 to Fond et al, U.S. Pat. No. 5,897,899 to Fond and U.S. patent application Ser. No. 09/748,495, pending, to the applicant. The coffee cartridge or capsule provides a good solution to the messiness problem, but it is costly to make and causes enviromental problem due to the disposal of the metal or plastic container materials in each cartridge or capsule.

The coffee pod (FIGS. 1a and 1b) also solve the messiness problem well, and is cheap to manufacture and do not create any environmental problem as the coffee cartridge or capsule does. However, the existing coffee pods do not work with conventional filter basket 27 (FIG. 2) as provided in current pump and steam espresso machines. There are two possible arrangements to fit the pill-shaped coffee pod 10 in the filter basket 27. The fist possible arrangement is to have the annular sealing seam 18 of the pod 10 supported by the annular rim 19 of the basket 27. This arrangement, although provides a good seal between the pod and pod holder, does not provide adequate support for the pod and will most likely cause the pod to be pushed into the basket by pressure above the pod during brewing process, thus breaking the seal. As a result, we noticed significant and unacceptable bypass of water through bypass channels formed between the sealing seam and the side wall of the filter basket. As expected, the resulting coffee or espresso was light-colored and watery.

The second possible arrangement (not shown) is to insert the pod 10 completely into the basket 27 until it reaches the bottom 20 of the basket. This arrangement does provide adequate support for the pod 10 by the bottom of the basket 27. However, significant water leak or bypass exists between the annular sealing seam 18 of pod 10 and the side wall 25 of the basket 27 due to the irregular spaces or channels formed by the interaction or squeezing of the annular sealing seam with the side wall 25 of the filter basket. In our tests, we noticed that the coffee coming out of the outlet 22 of the filter holder 29 had very light color and tasted more like water than coffee, which indicated that most water flowed through such irregular spaces or channels rather than through the coffee grounds 17 in the pod. Furthermore, the pod holder and pod were very wet and dripping after preparing the beverage, which would cause some messiness during disposal of the used pod.

As a result of such leak or bypass, special filter basket 27a and filter holder 29a (FIG. 3) are required to allow the consumers to make espresso or coffee with coffee pods. In such special filter holder (i.e. pod holder) 27a, a recessed part 19a of the rim 19 is dimensioned to receive and support the sealing seam 18. The bottom 20 of the filter holder 27a is shaped and dimensioned to fit lower half of the pod 10. To achieve sufficient seal between the bottom of the pod 10 and the bottom 20 of the filter holder 27a, the upper half of the pod 10 has to be pressed against the lower surface of the brew head in an espresso or coffee machine (not shown).

One drawback with such pod 10 and special filter basket 27a is that the special pod holder and basket holder add substantial cost to an espresso machine. As a result, most manufacturers do not provide such special filter basket and holder with their espresso machines. A second drawback is that most consumers find it cumbersome and confusing to have to use one set of holders for loose grounds and the other set of holders for coffee pods. This confusion and cumbersome is further increased by the fact that only one set of holders can be mounted to the machine at a time and the other set has to be pressed elsewhere in the kitchen. This also increases the chance for holders to get lost. A third drawback is that such special filter basket (or pod holder) 27a can not take two or more pods, which are desired by some consumers when they intend to make more than one cup of coffee or espresso drinks. A forth drawback with such special pod holder is that the used wet pod often sticks to the brew head rather than stays in the pod holder when the user remove the pod holder from the machine, which causes messiness and defeat at least some of the advantage of using coffee pod. A last drawback is the dripping and overflow of coffee that may occur when removing the pod holder from the machine since the pod holder 27a is too shallow, which causes messiness in the kitchen. These and other drawbacks are among the main reasons that prevent the popular use of coffee and espresso pods today.

It is a further object of the invention to provide a coffee pod that works with conventional filter baskets such as those for espresso machines.

It is a still further object of the invention to provide a coffee pod that allows the user to stack two or more coffee pods in a filter basket or pod holder to make two or more cups of coffee or espresso at a time.

It is a still further object of the invention to provide a coffee pod that solves the messiness problem of loose coffee grounds but does not causes other messiness issues in the kitchen.

It is a still further object of the invention to provide a coffee pod that for making a better cup of coffee or espresso.

It is therefore an object of the invention to provide consumers a low cost and environment friendly coffee pod.

It is a still further object of the invention to provide a beverage pod for making hot milk or hot chocolate.

It is a still further object of the invention to provide beverage pod(s) for making a mixed or blended beverage such as latte, cappuccino, or mocha.

It is a still further object of the invention to provide beverage pod(s) that can be sufficiently dried and drip-free right after the preparing the beverage.

It is a still further object of the invention to provide a method for using coffee pod to make a better cup of coffee or espresso.

It is a still further object of the invention to provide a method for consumers to conveniently dispose the used coffee pod.

Still other objects will become apparent after reading the accompanying drawings and description. It should be understood that the invention could still be practiced without performing one or more of the objects set forth above.

SUMMARY OF THE INVENTION

Accordingly, the invention provides a pod for making coffee, espresso, hot chocolate, mocha, latte or the like. The pod comprises a first sheet of filtering paper having an open top end, a bottom and a substantially vertical side wall adapted to form a seal with the vertical side wall of a pod holder, a second sheet adapted to fit to or into the open top end of the first sheet to form a closed chamber between the sheets, a supply of flavor-containing materials in the closed chamber, and an annular sealing seam between the side wall of the first sheet and the second sheet. The sealing seam is adapted to prevent formation of bypass channels between the pod and the side wall of a pod holder, thereby causing all or nearly all the hot water introduced to the pod holder to pass through the flavor-containing materials in the closed chamber between the first and second sheets. In one embodiment of the invention, the second sheet comprises an open top end, a bottom, and a substantially vertical side wall. The substantially vertical side wall of the second sheet is dimensioned to fit into the open upper end and the upper part of the substantially vertical side wall of the first sheet to form the sealing seam between the substantially vertical side walls of the first and second sheets. To prevent deformation of the pod during handling, a rigid disc having about the same diameter as the bottom of the first sheet may be sandwiched between the first and second sheets.

In another embodiment of the invention, the pod further comprises a third sheet having an open top end, a bottom and a substantially vertical side wall and a second flavor-containing materials. The bottom and substantially vertical side wall of the third sheet is dimensioned to fit into the open upper end and the upper part of the substantially vertical side wall of the second sheet to form a second closed chamber to contain the second flavor-containing materials and to form a sealing seam between the substantially vertical side walls of the second and third sheets. By selecting the appropriate first and second flavor-containing materials, such a pod can give a blended drink. For example if the first flavor-containing materials is milk particles and the second materials is espresso grounds, latte or cappuccino can be made front the pod.

In another embodiment of the invention, the second sheet comprises a sufficiently rigid liquid-permeable plate having a side wall adapted to be received into the open top end of the first sheet and to form the sealing seam with the upper part of the side wall of the first sheet. In a further embodiment of the invention, the substantially vertical side wall of the first sheet comprises a substantially vertical lower side wall, a neck, and a substantially flat upper side wall adapted to form the sealing seam with the second sheet. The neck functions to connect the substantially flat upper side wall to the substantially vertical lower side wall of said first sheet and to make the outer perimeter of the substantially flat upper side wall about the same as or smaller than the outer perimeter of the substantially vertical lower side wall.

Another aspect of the invention is a method for using the pod to make coffee, espresso, hot chocolate, mocha, latte or the like. The method comprises placing the pod(s) into a pod holder, forming a seal between the side wall and/or sealing seam of the pod(s) and the substantially vertical side wall of the pod holder when the pod is placed into the pod holder and the sealing seam is positioned inside the substantially vertical side wall of the pod holder, mounting the pod holder to a beverage apparatus, introducing hot water to the pod and forcing the water through the flavor-containing materials to extract or dissolve the flavor-containing materials to form fluid comestible, and discharging the fluid comestible into a receptacle such as a cup. The method may further comprise a step of transforming the fluid comestible into a high-speed fluid jet, a step of injecting high-speed fluid jet into a chamber capable of accumulating a pool of fluid comestible therein for generating fine air bubbles or crema, a step of separating the relatively large air bubbles from very fine air bubbles in a separation chamber, and a step of conducting only the very fine air bubbles and the fluid comestible near the bottom of the separation chamber to an outlet for discharging into the receptacle such as a cup. The method may further comprise a step of activating a ejection mechanism to push a movable plate normally resting on the bottom of the pod holder for supporting the pod away from the bottom of the pod holder to eject the used pod from the pod holder. The mounting step in the method may comprise causing a movable press to enter the pod holder and to press onto the pod(s) therein, causing the compression of a spring attached to the movable press, and causing the pod to press against the vertical side wall and the bottom of the pod holder with the force exerted to the movable press by the spring to achieve enhanced seal between the pod and the pod holder.

DESCRIPTION OF THE DRAWING

The accompanying drawing illustrates diagramatically non-limitative embodiment of the invention, as follows:

FIGS. 1a and 1b are the cross-section views of two pill-shaped coffee pods currently available in the market;

FIG. 2 is a cross-section view of one possible mounting arrangement of the coffee pod of FIG. 1a in a conventional filter basket;

FIG. 3 is a cross-section view of mounting arrangement of the coffee pod of FIG. 1a in a filter basket specially made to fit the coffee pod;

FIG. 8 is a cross-section view of another modified version of the new coffee pod of FIG. 4;

FIG. 8a is a cross-section view of a modified version of the new coffee pod of FIG. 4;

FIGS. 9–14 are cross-section views of other modified versions of the new coffee pod of FIG. 4;

FIG. 15 is a cross-section view of two coffee pods of FIG. 4 placed into a filter basket and mounted to a brew head to illustrate a method for using the new pods to make fluid comestibles;

FIG. 16 is a cross-section view of two coffee pods of FIG. 4 placed into a filter basket to illustrate another method for using the new pods to make fluid comestibles;

FIG. 16a is a cross-section view along line a—a of FIG. 16;

FIG. 17 is a cross-section view of one coffee pod of FIG. 4 placed into a filter basket to illustrate another method for using the new pod to make fluid comestibles.

DETAILED DESCRIPTION OF THE PREFERRED EMBODIMENTS

Figure 4:
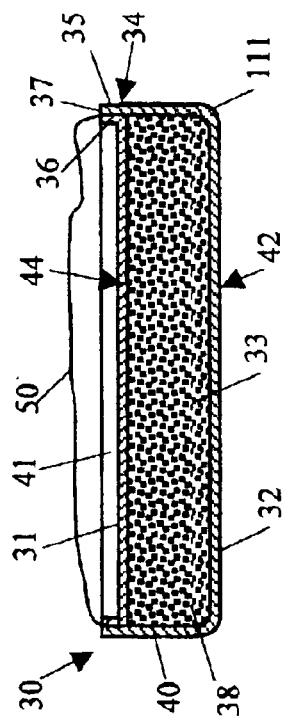
FIG. 4 is a cross-section view of the first embodiment of a new coffee pod according to the present invention.

Reference will now be made in detail to the present preferred embodiments of the invention, examples of which are illustrated in the accompanying drawings. Wherever possible, the same reference numbers are used in the drawings and the description to refer to the same or like parts.

FIGS. 1a and 1b show two prior-art pill-shaped coffee pods currently available in the market. FIGS. 2 and 3 show the filter baskets (i.e. pod holders) and basket holders for such prior-art pods. The benefits and shortcomings of such prior-art pods as well as FIGS. 1–3 have been discussed in the earlier section "Background of Invention" and will not be repeated here.

FIG. 4 shows a first embodiment of a new beverage pod 30 according to the present invention. The disc-shaped pod 30 comprises a first sheet of filtering paper 42 that is formed to have a open top end, a vertical side wall 40 and a bottom 32 and a second sheet of filter paper 44 that is also formed to have a open top end 41, a vertical side wall 36 and a bottom 31. The second sheet 44 is dimensioned to fit into the open top end of the first sheet 42 and to allow its vertical side wall 36 to be sealed to the upper part 35 of the vertical side wall 40 of the first sheet 42 to form a sealing seam 34 by sealing means 37. The sealing means 37 can be adhesive, pressure or force-induced mechanical sealing, heat induced sealing or any combination of these sealing mechanisms. A closed chamber 38 is formed between the sheets 42 and 44 for containing a supply of flavor-containing materials 33. The flavor-containing materials can be extractable materials such as roasted coffee or espresso grounds, tea or herb or water-soluble materials such as milk or cocoa powder or particles. The flavor-containing materials can also be any combination of these above materials.

Besides filter papers, the first and second sheets 42 and 44 can be other water-permeable thin materials such as woven or non-woven cloth, porous polymeric membranes, or thin polymer sheets with fine openings or cuts. The cuts on the thin polymer sheets are normally closed to prevent the flavor-containing materials from leaking out of the pod, but they opens up when pressure is applied above the sheet The first sheet 42 can be made from different materials than the second sheet 44. When thermoplastic materials are used, degradable plastics such as polylactide are preferred to reduce the burden to environment and heat-sealable polymers such as polyethylene, polypropylene and polyester are preferred to reduce cost. The material for the first sheet 42 is preferably sufficiently soft or flexible to achieve sufficient seal between the side wall 40 of the pod and the side wall 25 of the pod holder.

Figure 5B:
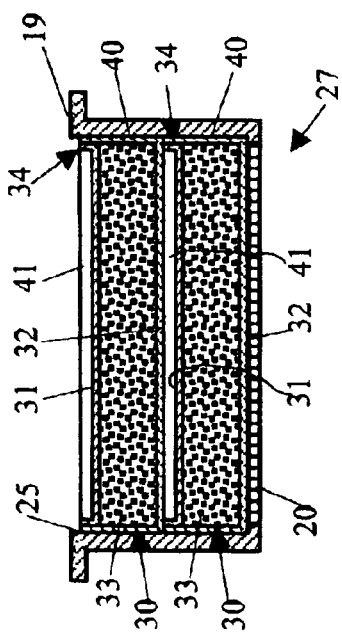
FIG. 5b is a cross-section view of two new coffee pods of FIG. 4 placed into a conventional filter basket.
Figure 5A:
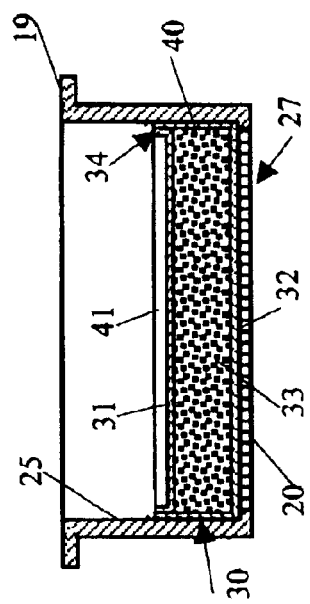
FIG. 5a is a cross-section view of one new coffee pod of FIG. 4 placed into a conventional filter basket.

Unlike the sealing seam 18 in the prior-art pods 10 of FIGS. 1a and 1b, which sealing seam extends horizontally out of the pod body and prevents intimate contact between the pod 10 and the side wall 25 of the pod holder 27, the sealing seam 34 in the pod 30 is vertical and allows intimate contact between the vertical side wall 40 of pod 30 and the vertical side wall 25 of the pod holder 27 (FIG. 5a). As a result, pod 30 can readily form a sufficient seal with the side wall 25 of the pod holder 27 and cause all or at least most of the hot water above the pod to pass through the flavor-containing materials 33. In addition, unlike the sealing seam 18 in the prior-art pods 10 which forms wrinkles and bypass channels to allow water to pass through without contacting the coffee grounds 17, the sealing seam 34 itself can form good seal with side wall 25 of the pod holder 27. It is appreciated that the seal between the vertical side wall 40 of the pod 30 and the vertical side wall 25 of the pod holder 27 is sufficient to cause all or nearly all the hot water introduced into the pod holder to pass through the flavor-containing materials such as coffee grounds. As a result, a seal between the sealing seam 34 and the side wall 25 of the pod holder 27 is desired but not necessary. For this reason, the modified pods 30 of FIGS. 8 and 8a, which will be described in more detail later, make as strong and thick-bodied coffee as the pod 30 of FIG. 4 can, even though their sealing seams 34 do not form a seal with the vertical side wall 25 of the pod holder 27.

The sealing seam 34 can be long or high enough to function as a handle for the pod 30. To make it easier for the user to grab the sealing seam as a handle, the sealing seam 34 may made different shapes and configurations. For example, two or more cut-outs may be made on the sealing seam to make the annular sealing seam into two or more flaps for the user to grab (not shown).

The sealing seam 34 in pod 30 may be made impermeable or less permeable to water through the use of certain adhesive (e.g. silicone, urethane or hot-melt based adhesives) in making the seal 37 or by using extensive force when making the seal. The sealing seam 34 can also be made impermeable or less permeable to water when at least one of the sheets 42 and 44 comprises thermoplastic material(s) which can deform or melt when under high enough force or hot enough temperature when making the sealing seam 34 during the manufacturing process.

It is appreciated that the pod 30 can adopt various different shapes besides the disc shape as shown in FIG. 4. For examples, the cross section of the pod can be oval, circular, square or rectangular shape. Along the thickness direction, the pod can be short to shape as a disc (FIG. 4) or a plate, can be long to shape as a rod or cylinder, or can be tapered to shape as frustum. Consequently, the pod holder 27 will adopt different shapes so that the side wall 25 of the pod holder can form an intimate seal with the side wall 40 and/or the sealing seam 34 of the pod 30.

To use the pod, the consumer or user simply places or inserts one pod 30 (FIG. 5a), two pods 30 (FIG. 5b) or more pods if the pod holder is deep enough (not shown) into the pod holder 27. Since the inside diameter of the pod holder 27 is about equal to the pod 30, a seal is automatically formed between the side wall 40 of the pod 30 and the side wall 25 of the pod holder 27 when the pod is being inserted into the pod holder. When only one pod 30 is used, the bottom 32 of the pod may be supported by the perforated bottom 20 of the pod holder. Additional seal is obtained between the bottom 32 of the pod and the bottom 20 of the pod holder if the pod is pushed all the way down tightly against the bottom 20 of the pod holder. Such additional seal is desirable, but is not necessary for the pod to work properly since the seal between the side wall 30 of the pod and the side wall 25 of the pod holder is sufficient to cause all or most of the hot water introduced into the pod holder to pass through the flavor-containing materials 33 sandwiched between the sheets 42 and 44.

When two or more pods are placed into the pod holder, only the bottom 32 of the lower or lowest pod may be supported by the bottom 20 of the pod holder. The bottom 32 of the other pod(s) in the pod holder will be supported by the top end of the pod below it. In FIG. 5b, it is shown that the bottom 32 of the upper pod 30 rests on the sealing seam 34 of the lower pod 30. The bottom 32 and part of the side wall 40 of upper pod 30 can be pushed into the open top end 41 and the side wall 40 of the lower pod 30 by the force exerted by the user when inserting the second (upper) pod or by the water pressure from the brewing apparatus. As a result, the bottom 32 of the first sheet 42 in the upper pod 30 is supported by the bottom 31 of the second sheet 44 in the lower pod 30. By having the bottom 32 of the upper pod 30 received into the open upper end 41 and the side wall 36 of the second sheet 44 of the lower pod, the seal between sealing seam 34 of the lower pod and the side wall 25 of the pod holder 27 is also improved.

(Please note that the wall thickness for sheets 42 and 44 shown in FIG. 4 and other figures is exaggerated to make the sheets readily visible. When the sheets are filter paper, its thickness can be as small as 0.02 to 0.1 millimeters. Such small wall thickness for the sheets make it easier for the upper pod 30 to be pushed into the open top end 41 of the second sheet 44 in the lower pod 30.)

It is appreciated that such force exerted by the user when inserting the second (upper) pod or by the water pressure may cause the sealing seam 34 of the lower pod 30 to bend inward or become flat. This, although not as desirable as to have the bottom 32 of the upper pod 30 received into the open upper end 41 of the lower pod, does not have any significant impact on the seal between the side wall 40 of the lower pod 30 and the side wall 25 of the pod holder 27.

To facilitate the bottom 32 of the first sheet 42 in the upper pod 30 to enter the open upper end 41 and side wall 36 of the second sheet 44 in the lower pod 30, a rounded bottom 111 (refer to FIG. 6) can be formed at the lower part of the side wall 40 of the first sheet 42 of pod 30. The lower part of the side wall 40 of the first sheet 42 of pod 30 can be tapered (refer to FIG. 14) to achieve similar result. It is also appreciated that the lower part of the side wall 40 of the first sheet 42 of pod 30 can be made to have a smaller diameter than the rest of the side wall 40 to enable it to be readily receivable by the open upper end 41 and side wall 36 of the second sheet 44 in a lower pod.

Figure 6:
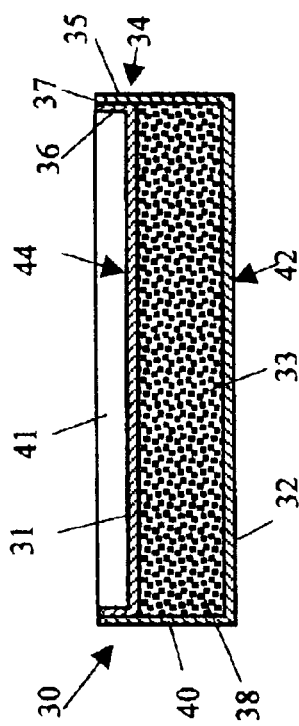
FIG. 6 is a cross-section view of a modified version of the new coffee pods of FIG. 4.

FIG. 6 also shows a thin strip or filament 50 attached to the sealing seam 37 of the pod 30 for facilitating the handling of the pod. The strip or filament 50 can be sufficiently thin so that it will not prevent the open upper end 41 of one pod 30 from receiving the bottom part of another pod. It is appreciated that the strip, string or filament 50 can be attached to other part of the pod 30 such as the side wall 40 or bottom 32 of the first sheet 42 or the bottom 31 or side wall 36 of the second sheet 44. It is also appreciated that the strip or filament also works well in facilitating the handling of the pod when only one of its ends is attached to the pod. It is also appreciated that any middle part of a strip, string or filament can be attached to the pod to make the ends of the strip, string or filament free. It is further appreciated that the string, strip or filament can be formed into sheets 42 and 44, preferably sheet 44 only, when the sheet(s) is made or cut.

Figure 7:
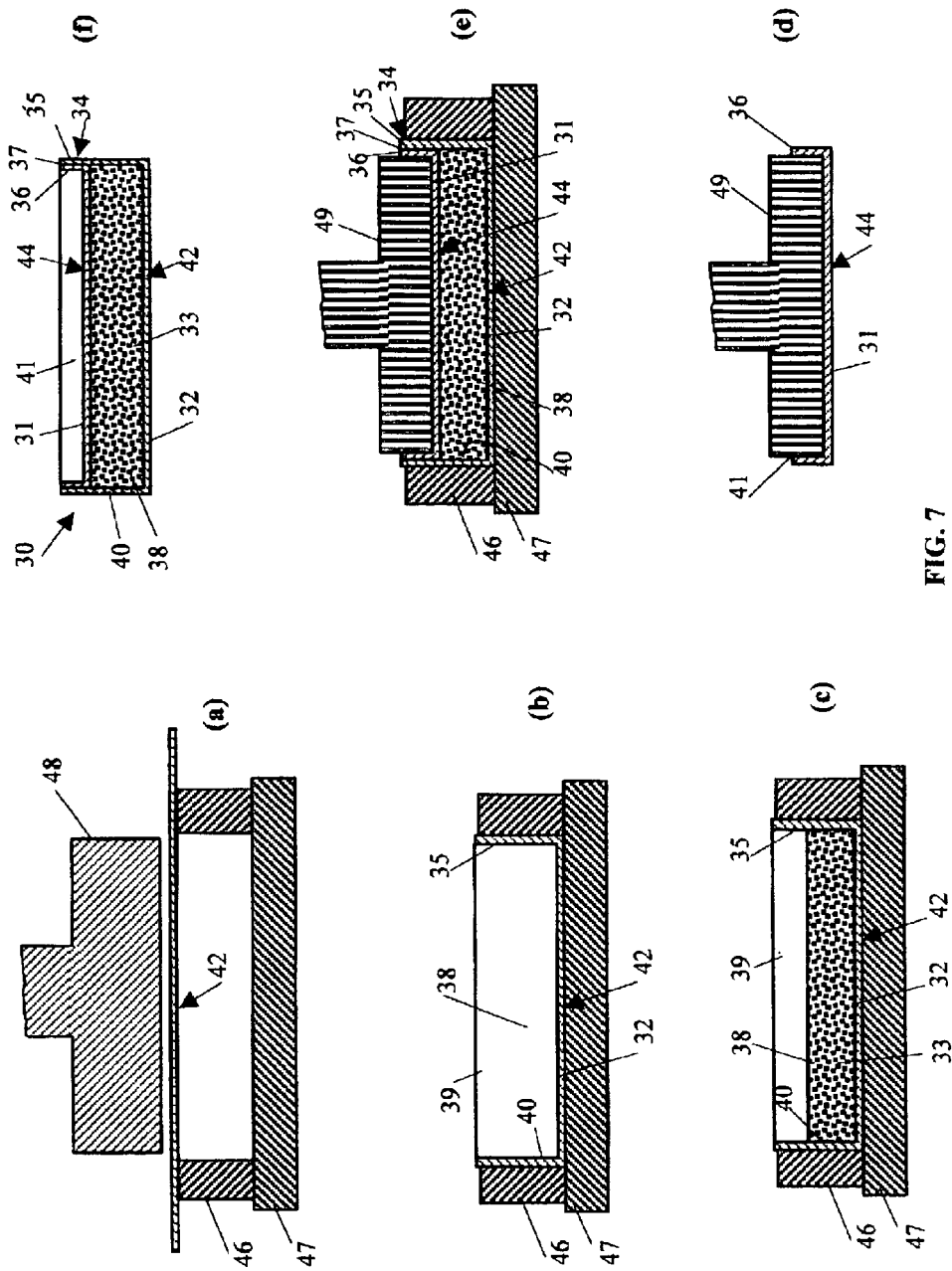
FIGS. 7a–7f illustrate an exemplar process for making one coffee pod of FIG. 4.

FIGS. 7a to 7f show one exemplar process for making pod 30 of FIG. 4. FIG. 7a shows that a first sheet 42 of filtering paper in its flat configuration is placed above a mold 46 having a movable bottom 47 and below a die 48. The die 48 is designed to push the sheet 42 into the mold 46 to form the sheet. FIG. 7a shows the first sheet 42 in its formed configuration. The formed first sheet 42 has an open upper end 39, a bottom 32, a vertical side wall 40 and a chamber 38. FIG. 7c shows a supply of coffee grounds 33 added into the chamber 38 of the first sheet 42. FIG. 7d shows another die 49 and a second sheet 44 of filter paper formed around its bottom part. The second sheet 44 has an open upper end 41, a bottom 31 and a vertical side wall 36. FIG. 7e shows that the second sheet 44 is inserted into the open upper end 39 and chamber 38 of the first sheet 42 to enclose and seal the supply of coffee grounds 33 in chamber 38. It is appreciated that the second sheet 44 can also be formed by placing a flat sheet of filter paper above the mold 46 of FIG. 7c and pushing the filter paper into the open upper end and the side wall 40 of the first sheet 42. A sealing seam 34 is formed to join the side wall 36 of the second sheet with the top part 35 of the side wall 40 together by sealing means 37. The sealing means 37 can be adhesive(s) or hot melts on one of the sheets or both the sheets, pressure or force-induced mechanical joining of the sheets, heat induced joining of the sheets, or any combination of these sealing mechanisms. It is appreciated that the die 49 can be adapted to expand or the mold 46 can be adapted to contract during the sealing process to help make the sealing seam. After forming the sealing seam 34, the movable bottom plate 47 is moved away and the pod 30 shown in FIG. 7f is pushed out of the mold 46 by the die 49 into a receiving container for the pods 30.

FIG. 8 shows another modified version of the pod 30 of FIG. 4. This modified pod is substantially similar to the pod 30 of FIG. 4 except that part of the side wall 40 of the first sheet 42 is bulged out, and the annular sealing seam 34 is retracted away from side wall 40 and towards the center of the pod. The bulged-out part of the side wall 40 is given a designation number 112. As a result, the sealing seam 34 of FIG. 8 may not contact the side wall 25 of the pod holder 27. One benefit of such a modification is that it is easier for the user to hold the sealing seam to place this modified pod 30 into the pod holder 27, especially if the pod holder is very deep.

FIG. 8a is a modified version for pod 30 of FIG. 8. In this modified pod, the side wall 40 of the first sheet 42 is divided into the upper side wall 35, the substantially vertical lower side wall 112 and a neck 106 connecting the upper side wall 35 and substantially vertical lower side wall 112. The upper side wall 35 is made substantially horizontal to form the horizontal sealing seam 34a with a substantially flat second sheet 44. It is, however, appreciated that the upper side wall 35 can be tapered or adopt other shape. One key benefit of this modified pod 30 is that when a second pod is stacked over a first pod in a pod holder, it will help improving the seal between the lower side wall 112 and the side wall 25 of the pod holder. In addition, such stacking will be very consistent since both the top end 31 and bottom 32 of the pod are substantially flat. Another key benefit is that even if the sealing seam 34a of this modified pod is a little too wide and goes beyond the vertical lower side wall 112 a little due to imprecise manufacturing or other reasons, such a sealing seam will have limited negative impact on the seal between the vertical lower side wall 112 and the side wall 25 of the pod holder due to the buffer effect of the neck 106.

FIG. 9 shows another modified version of the pod 30 of FIG. 4. This modified pod is substantially similar to the pod 30 of FIG. 4 except that it further comprises a rigid disc 104 having numerous openings 101 attached to the lower surface of the bottom 41 of the second sheet 44. The rigid disc 104 functions to prevent the pod 30 from being deformed during shipping and storage as well as during the handling by the user. It also functions to prevent the flavor-containing materials from moving around within the pod, thus preventing any localized thinning, which would cause bypass during brewing process, of the flavor-containing materials in the pod. In case that the flavor-containing materials is tightly packed espresso or coffee grounds, this rigid disc will also help maintaining the grounds in a tightly packed state during handling or transportation. It is appreciated that the rigid disc 104 can be attached to the upper surface of the bottom 32 of the first sheet 42. It is also possible to have the rigid disc 104 positioned anywhere else between the bottom 41 of the second sheet 44 and the bottom 32 of the first sheet 42 or to have it attached to the upper surface of the bottom 41 of the second sheet 44 or to the lower surface of the bottom 32 of the first sheet 42. It is also appreciated that the rigid disc 104 may be replaced by a rigid ring-shaped disc, i.e. a rigid disc with one large opening in its center. It is further appreciated that when the rigid disc 104 is implemented in the pods 10 of FIGS. 1a and 1b, similar benefits can be achieved.

FIG. 10 shows another modified version of the pod 30 of FIG. 4. This modified pod is similar to the pod 30 of FIG. 4 except that the second sheet 44 of FIG. 4 is replaced by a rigid or semi-rigid thermoplastic disc 105 having numerous openings 107. The upper part 35 of the side wall of the first sheet is heat sealed or staked to the outside wall 108 of the disc 105 to form the sealing seam 34. The upper part 35 of the side wall of the first sheet may be folded and heat-staked to the top surface of the disc 105 (not shown). This modified pod 10 has all the benefits of the pod 10 of FIG. 9, but is simpler in design. To improve the seal between the vertical side wall 40 of the pod and the vertical side wall 25 of the pod holder, the outer diameter of the side wall 40 may be made a little larger than that of the rigid disc 105. For very fine flavor-containing materials 33 such as espresso coffee grounds or milk powder which may leak out of the fine openings 107 on the disc 105, these openings may be replaced by numerous cuts or very thin slots which are normally almost closed but would become open when pressure is applied above the pod 10. Another solution is to attach a filter paper to the disc 105 to cover the openings 107.

FIG. 11 shows yet another modified version of the pod 30 of FIG. 4. This modified pod comprises a first sheet of filtering paper 42 having an open top end, a bottom 32 and a substantially vertical side wall 40, a second sheet of filter paper 42a having an open top end, a bottom 32a and a substantially vertical side wall 40a, a third sheet 44 having an open top end 41, a bottom 31 and a substantially vertical side wall 36. The second sheet 42a is adapted to fit into the open top end and side wall 40 of the first sheet 42 to define a closed first chamber 38 for containing a first flavor-containing materials 33. The third sheet 44 is adapted to fit into the open top end and side wall 40a of the second sheet 42a to define a closed first chamber 38a for containing a second flavor-containing materials 33a. The sealing seam 34 is formed between the side wall 36 of the third sheet 44 and the top part 35a of the said wall 40a of the second sheet 42a and between the top part 35a of the said wall 40a of the second sheet 42a and top part 35 of the first sheet 42 to prevent the first and second flavor-containing materials from leaking out of the pod.

The first and second flavor-containing materials 33 and 33a are intended to be different materials to make blended drinks such as latte, cappuccino, mocha, milk-containing coffee and flavored espresso or coffee drinks. For example, when the first flavor-containing materials 33 is the amount of milk particles required for making latte and the second flavor-containing materials 33a is espresso coffee grounds, latte will be made from the pod. It is preferred that the first flavor-containing materials 33 is water soluble materials such as milk or cocoa since such materials is found to clog the filter paper quickly and the second flavor-containing materials 33a is insoluble materials such as coffee grounds. In this preferred arrangement, the second sheet 42a is a fine filter paper to filter the coffee grounds and the first sheet 42 is a paper filter sufficiently coarse to prevent the clogging of the filter paper by gels or other matters in the water soluble materials.

It is appreciated that the first, second and third sheets can be materials other filter paper. For example, the second and/or third sheets can be replaced by a disc 105 similar to that for the pod of FIG. 10. It is also appreciated that the side walls for one or more the first, second and third sheets can be tapered or bulged. It also appreciated that the sealing seam 34 can be horizontal, although such a sealing seam would have some similar issues as the prior-art pod 10 of FIG. 1a or 1b.

Figure 12:
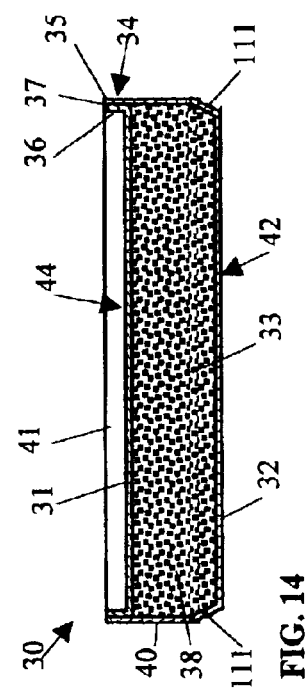
Figure 13:
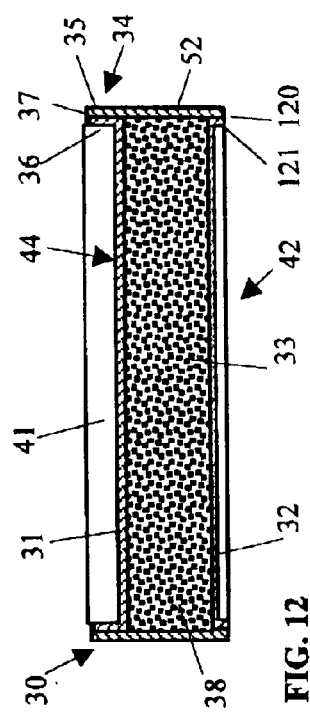

FIG. 12 shows yet another modified version of the pod 30 of FIG. 4. In this modified pod the second sheet 44 is identical to that of the pod 30 of FIG. 4, while the first sheet 42 comprises a cylindrical filter paper 52 as the side wall and a round bottom 32 made of filter paper having a fringe 121 attached to the lower end of the cylindrical filter paper 52 by sealing means 120 such as adhesive, heat seal or pressure-induced mechanical joining. FIG. 13 shows yet another modified version of the pod 30 of FIG. 4. In this modified pod, the side wall 40 of the first sheet 42 is slightly tapered and the bottom 31 of the second sheet 44 is bulged upward. A thin strip, string or filament 50 is attached to or formed into bottom 31 of the second sheet 44 for facilitating the handling of the pod.

Figure 14:
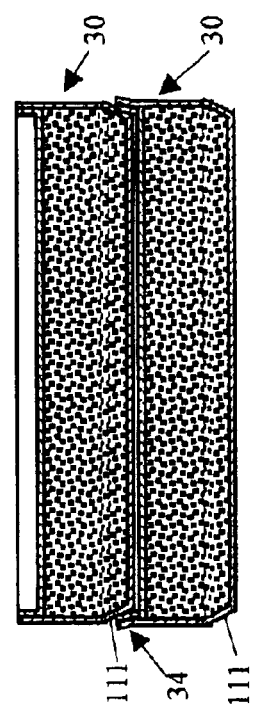
Figure 14A:
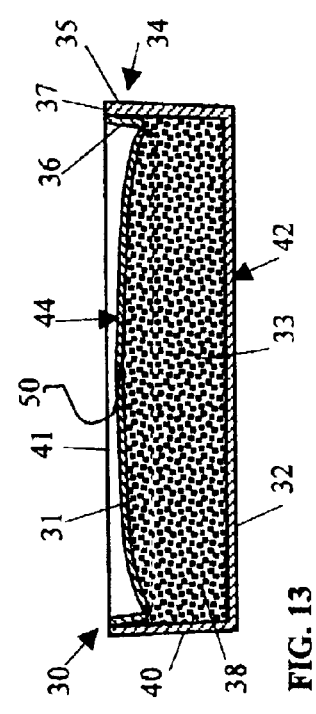
FIG. 14a is a cross-section view of two modified coffee pods of FIG. 14 stacked together.

FIG. 14 shows yet another modified version of the pod 30 of FIG. 4. In this modified pod, the lower part of the side wall 40 of the first sheet 42 is slightly tapered to form a tapered bottom edge 111. Such tapering allows the bottom of one pod 30 to fit into the open top end 44 and side wall 36 of the second sheet 44 readily (FIG. 14a). This helps in facilitating the storage and transportation of the pods and making it easy for the user to stack two or more pods into a pod holder consistently.

FIG. 15 shows a method of using the pods to make beverages such as coffee or espresso. The user places a coffee or espresso pod 30 into the pod holder 27 and the pod is supported by a plurality of cylindrical protrusions 56 formed and uniformly distributed on the bottom of the pod holder. A seal is automatically formed between the side wall 40 of the pod and the side wall 25 of the pod holder 27. To make two cups of coffee or espresso, the user places a second coffee or espresso pod 30 into the pod holder above the first pod. Again, a seal is automatically formed between the side wall 25 of the pod holder 27 and the side wall 40 of the second pod. The user then places the pod holder 27 into a brew station 61 with the assistance of handle 66. The pod holder 27 is then sealed to the brew head 64 having a Y-shaped seal member 67 adapted to seal against the rim 19 of the pod holder and having an inlet 71 connected to an apparatus (not shown) capable of producing pressurized hot water.

Turn on the apparatus to introduce hot water under pressure to the pod holder. As a result of the seal formed between the vertical side walls 40 of the two pods and the vertical side wall 25 of the pod holder, all or nearly all the hot water is forced through the flavor-containing materials between the first and second sheets of the top pod and then through the flavor-containing materials between the first and second sheets of the lower pod to extract the coffee grounds. The resulting coffee or espresso is collected in the space 57 below the first sheet of the lower pod and transformed into a high-speed fluid jet by the orifice 55 of the pod holder. The fluid jet is injected into a small chamber 117 capable of accumulating a pool of coffee therein for generating fine air bubbles or crema for the coffee or espresso. The coffee or espresso and fine air bubbles in chamber 117 flows into a separation chamber 53 wherein the relatively large air bubbles in the coffee or espresso float up and separate from very fine air bubbles and coffee. Only the mix of the very fine air bubbles and coffee flow out via an opening 59 at the bottom of the separation chamber and into an outlet 60 for discharging into a receptacle such as a cup.

After preparing coffee or espresso, unlike the pods 10 of FIGS. 1a and 1b, the pod(s) 30 in the pod holder 27 was substantially dry and had essentially no dripping. It is theorized that the good seal between side wall 40 of the pods 30 and the vertical side wall 25 of the pod holder 27 causes a sufficient amount of compressed air to be trapped in the space between the pod 30 and the brew head 64. After the apparatus stops introducing hot water into the pod holder, the trapped compressed air forces the remaining hot water in and above the pod through the coffee grounds, therefore drying the wet coffee grounds.

The seal formed between the vertical side wall 25 of the pod holder 27 and the vertical side wall 40 of the pod(s) can be enhanced by a pod press 85. When the pod holder 27 and the pod(s) 30 therein are brought to the brew head 64 or vice versa, the pod 30 causes a movable press 86 to move upwards, which in turn causes the compression of a spring 70 attached to the movable press. The movable press 86 is attached to a sliding rod 73 partially received in the inlet 71 and maintained therein by a disc 72 at the end of the sliding rod and a shoulder 74 below the inlet 71. The sliding rod 73 and spring 70 should be long enough to enable the movable press 86 to reach and press the pod 30 in the pod holder 27 even when there is only one pod in the pod holder.

After the brew station 61 and brew head 64 are locked to form a seal between Y-shaped seal member and the rim 19 of the pod holder, the compressed spring 70 applies a force to the pod via the movable press 86. The press 86 distributes part of this force to the side walls 40 of the pods 30 against the vertical side wall 25 of the pods holder, which enhances the seal between the side walls 40 of the pods and side wall 25 of the pod holder, and the other part of the force to the bottoms 32 of the pods against cylinders 56 on the bottom of the pod holder. The movable press 86 has an annular ring 68 for directing the force to the pod 30 and a plurality of openings 69 to allow the hot water to reach the pod 30.

FIGS. 16 and 16a show a pod ejection method for ejecting the used coffee pods from pod holder 27 after beverage preparation. To eject the used pods 30, the user simply pushes the ball 83 downwards, which causes a string 77 to pull a fork-shaped plate 80 connected to the bottom 90 of the pod holder by binge 84 upwards. The two teeth 79 (FIG. 16a) of the fork-shaped plate 80 in turn push a movable plate 78 that normally rests on and seals to the bottom 90 of the pod holder via an o-ring 76 and having numerous rods 56 for supporting the pod 30 upwards, thereby pushing pods above the movable plate 78 upwards and ejecting the pods out of the pod holder.

FIG. 17 shows another pod ejection method for ejecting the used coffee pod 30 from pod holder 27 after beverage preparation. To eject the used pod 30, the user simply pushes the cylinder 95 upwards, which causes the movable plate 78 that normally rests on and seals to the bottom 90 of the pod holder via an o-ring 76 and having a disc 92 with numerous openings 91 for supporting the pod 30 upwards, thereby pushing pod above the movable plate 78 upwards and ejecting the pod out of the pod holder.

The scope of the invention is obviously not restricted to the various embodiments described by way of examples and depicted in the drawings, there being numerous changes, modifications, combinations, additions, and applications thereof imaginable within the purview of the claims.

What is claimed is:

1. A pressure brewing pod for brewing a cup of beverage by extraction under pressure in a coffee machine comprising a brew head having a seal member and a pod holder having a top end adapted to form a watertight seal with the seal member and a bowl-shaped inner space bounded by a bottom and a side wall, said pressure brewing pod comprising a water permeable top sheet, a water permeable bottom sheet and a supply of flavor-containing materials sandwiched between said sheets, said top and bottom sheets being connected to one another by an annular sealing seam to form a closed chamber to enclose said materials, said closed chamber having a top surface adapted to face the brew head, a bottom surface adapted to rest on the bottom and extend over the bottom to the side wall of the holder, and a chamber side wall of a predetermined height adapted to contact the side wall of the holder, said top sheet comprising said top surface of said closed chamber and said bottom sheet comprising said bottom surface and at least the lower part of said chamber side wall of said closed chamber, wherein said annular sealing seam protrudes a predetermined height above said top surface of said closed chamber, said predetermined height of said annular sealing seam being shorter than said predetermined height of said chamber side wall, and wherein:

said closed chamber is adapted to cause intimate contact between the side wall of the holder and said chamber side wall around said closed chamber to form a seal before the hot water reaches and wets said pressure brewing pod, said seal being adapted to substantially prevent the hot water fed under pressure to the top of the holder by means of the coffee machine from passing through even if the level of the hot water in the holder is substantially above said annular sealing seam, thereby preventing the hot water under pressure from bypassing said flavor-containing materials in said closed chamber;

said at least the lower part of said chamber side wall is adapted to be sufficiently soft and flexible for facilitating the formation of said intimate contact and said seal between the side wall of the holder and said chamber side wall around said closed chamber when said pod is placed into the bowl-shaped inner space of the holder;

said annular sealing seam comprises such a shape and dimension that the insertion of said annular sealing seam into the inner space of the holder will not cause substantial change of the shape and dimension of said closed chamber, thereby enabling consistent formation of said intimate contact and said seal between the side wall of the holder and said chamber side wall around said closed chamber; and in use, said seal is formed between the side wall of the holder and said chamber side wall after said pressure brewing pod is placed in the bowl-shaped inner space of the holder and prior to the introduction of hot water to the holder, causing the hot water fed under pressure from the coffee machine to the holder sealed to the brew head by the seal member to be pressed by the pressure from said top surface of said closed chamber through said closed chamber for extracting said flavor-containing materials enclosed therein, the beverage extract formed flowing from said bottom surface of said closed chamber and out of the holder.

2. A pressure brewing pod as defined in claim 1 wherein said predetermined height of said chamber side wall is sufficiently short to allow said supply of flavor-containing materials to completely fill all available space in said closed chamber.

3. A pressure brewing pod as defined in claim 1 wherein said predetermined height of said chamber side wall is sufficiently short to prevent said top surface of said closed chamber from contacting the brew head, thereby preventing the problems caused by pod contacting the brew head associated with the current industry standard pods.

4. A pressure brewing pod as defined in claim 1 wherein said closed chamber is adapted to cause a supply of compressed air to form above said top surface of said closed chamber during a brewing cycle, said compressed air drying said pod after the coffee machine stops feeding hot water to the holder to make said pressure brewing pod drip-free for disposal.

5. A pressure brewing pod as defined in claim 1 wherein said closed chamber and annular sealing seam are adapted to allow one said pod to be received in the bowl-shaped inner space of the holder and to form said seal between said chamber side wall and the side wall of the holder, and to also allow a plurality of said pods to be received in the bowl-shaped inner space of the holder and to form said seal between said chamber side wall for each of the plurality of said pods and the side wall of the holder both during and before brewing the beverage, thereby allowing consumers to use the same holder to brew one cup of beverage by placing one said pod into the holder and to brew a larger volume of beverage by placing a plurality of said pods into the holder.

6. A pressure brewing pod as defined in claim 5 wherein said annular sealing seam protrudes a predetermined height above said top surface of said closed chamber, and is adapted to receive part of the closed chamber of another said pod there above in such a way to improve the seal between said annular sealing seam and the side wall of the pod holder.

7. A pressure brewing pod as defined in claim 5 wherein at least the top part of the side wall of the holder is vertical to allow said chamber side wall for each of the plurality of said pods to form said seal to the side wall of the holder.

8. A pressure brewing pod as defined in claim 1 wherein said water permeable top and bottom sheets are made from flexible filter paper.

9. A pressure brewing pod as defined in claim 1 wherein said bottom sheet is made from a thin plastic film so formed to have an open top end, a side wall and a bottom and said top sheet is adapted to be receivable in said open top end of said bottom sheet and to be sealed to the upper part of said side wall of said bottom sheet to form said annular sealing seam, said bottom sheet comprising a plurality of normally closed cuts at least on its said bottom, said normally closed cuts being adapted to open when the hot water fed under pressure from the coffee machine to the holder is pressed by the pressure from said top surface of said closed chamber through said flavor-containing materials to said bottom surface of said closed chamber, thereby making said bottom sheet water permeable and allowing the beverage extract to flow out of said closed chamber through said cuts.

10. A pressure brewing pod as defined in claim 1 wherein said flavor-containing materials comprises a supply of roasted coffee grounds and a supply of water soluble solids, said bottom surface of said closed chamber comprising a plurality of normally closed cuts, said normally closed cuts being adapted to open when the hot water fed under pressure from the coffee machine to the holder is pressed by the pressure from said top surface of said closed chamber through said flavor-containing materials to said bottom surface of said closed chamber.

11. A pressure brewing pod as defined in claim 1 wherein said top sheet comprises an anti-deformiation disc having a peripheral edge attached to said bottom sheet to form said annular sealing seam directly and immediately above said closed chamber and a plurality of openings on said disc for the hot water fed to the holder under pressure to enter said closed chamber to extract said flavor-containing materials therein, said anti-deformation disc being adapted to be sufficiently rigid to protect the shape and dimension of said closed chamber there below, thereby ensuring consistent formation of said intimate contact and said seal between the side wall of the holder and said chamber side wall around said closed chamber.

12. A pressure brewing pod as defined in claim 1 wherein said top sheet comprises an anti-deformation ring having a peripheral edge attached to said bottom sheet to form said annular sealing seam directly and immediately above said closed chamber and a filter connected to said ring, said anti-deformation ring being adapted to be sufficiently rigid to protect the shape and dimension of said closed chamber there below, thereby ensuring consistent formation of said intimate contact and said seal between the side wall of the holder and said chamber side wall around said closed chamber.

13. A pressure brewing pod as defined in claim 1 wherein said closed chamber, said annular sealing seam and said supply of flavor containing materials are adapted to cause said annular sealing seam to be located immediately adjacent to the top surface of said supply of flavor-containing materials in said closed chamber and to extend upwards from said chamber side wall at a direction substantially perpendicular to at least one of said top and lower surfaces of said closed chamber.

14. A pressure brewing pod as defined in claim 1 wherein said top sheet comprises anti-deformation plate member having a peripheral edge attached to the top end of said chamber side wall to form said annular sealing seam in such a way that said seam does not substantially protrude above said top surface of said closed chamber, said anti-deformation plate member being sufficiently rigid to protect the shape and dimension of said closed chamber there below, thereby ensuring consistent formation of said intimate contact and said seal between the side wall of the holder and said chamber side wall around said closed chamber.

15. A pressure brewing pod as defined in claim 1 wherein said top sheet comprises an anti-deformation plate member attached to the top end of said closed chamber and adapted to protect the shape and dimension of said closed chamber there below, thereby ensuring consistent formation of said intimate contact and said seal between the side wall of the holder and said chamber side wall around said closed chamber.

16. A pressure brewing pod as defined in claim 1 wherein said flavor-containing materials is packed sufficiently tight in said closed chamber to facilitate the formation of said intimate contact and said seal between the side wall of the holder and said chamber side wall around said closed chamber.

17. A pressure brewing pod as defined in claim 1 wherein at least part of said chamber side wall of said closed chamber is adapted to bulge out beyond said annular sealing seam for facilitating the formation of said intimate contact and said seal between the side wall of the holder and said chamber side wall as said pod is being inserted into the bowl-shaped inner space of the holder.

18. A pressure brewing pod as defined in claim 1 wherein said shape and dimension of said annular sealing seam are adapted to cause the formation of a second seal between said annular sealing seam and the side wall of the holder as said annular sealing seam along with said pressure brewing pod is being inserted into the bowl-shaped inner space below the top end of the holder, thereby further insuring that the hot water fed under pressure to the top of the holder by means of the coffee machine can not bypass said flavor-containing materials in said closed chamber even if the level of the hot water in the holder is substantially above said annular sealing seam.

* * * * *